(12) United States Patent
Trojan

(10) Patent No.: US 11,375,055 B2
(45) Date of Patent: Jun. 28, 2022

(54) HOLDER ASSEMBLY FOR MOBILE TERMINAL EQUIPMENT

(71) Applicant: Collatz+Trojan GmbH, Hamburg (DE)

(72) Inventor: Michael Trojan, Hamburg (DE)

(73) Assignee: Collatz+Trojan GmbH, Hamburg (DE)

( * ) Notice: Subject to any disclaimer, the term of this patent is extended or adjusted under 35 U.S.C. 154(b) by 0 days.

(21) Appl. No.: 16/628,352

(22) PCT Filed: Jul. 3, 2018

(86) PCT No.: PCT/DE2018/000201
§ 371 (c)(1),
(2) Date: Jan. 3, 2020

(87) PCT Pub. No.: WO2019/007450
PCT Pub. Date: Jan. 10, 2019

(65) Prior Publication Data
US 2020/0128120 A1  Apr. 23, 2020

(30) Foreign Application Priority Data

Jul. 4, 2017 (DE) .................... 20 2017 003 503.0

(51) Int. Cl.
| H04M 1/04 | (2006.01) |
| B60R 11/02 | (2006.01) |
| G06F 1/16 | (2006.01) |
| H04B 1/3877 | (2015.01) |
| B60R 11/00 | (2006.01) |
| H04M 1/02 | (2006.01) |

(52) U.S. Cl.
CPC .............. *H04M 1/04* (2013.01); *B60R 11/02* (2013.01); *G06F 1/1626* (2013.01);
(Continued)

(58) Field of Classification Search
CPC .... H04M 1/04; H04M 1/0274; H04M 1/6075; H04M 1/0279; H04M 1/185;
(Continued)

(56) References Cited

U.S. PATENT DOCUMENTS

| 7,221,960 B2 * | 5/2007 | Schlegel ................ H01R 24/50 361/761 |
| 2004/0132343 A1 | 7/2004 | Bisplinghoff |
(Continued)

FOREIGN PATENT DOCUMENTS

| DE | 199 55 095 A1 | 5/2001 |
| DE | 20 2014 101 923 U1 | 6/2014 |
(Continued)

OTHER PUBLICATIONS

International Search Report corresponding to PCT Application No. PCT/DE2018/000201, dated Nov. 20, 2018 (German and English language document) (8 pages).

*Primary Examiner* — Andrew Wendell
(74) *Attorney, Agent, or Firm* — Maginot, Moore & Beck LLP

(57) ABSTRACT

The disclosure relates to a universal holder assembly for mobile terminal equipment, for both physically holding and supporting same and for electrically recharging said mobile terminal equipment. This is achieved by a holder assembly comprising either a housing designed with a base surface, said housing having an interior designed to hold mobile terminal equipment, or an adapter element designed with a base surface that can be mechanically and physically connected to a mobile device, the inner and outer faces of the base surface being provided with electrical contact means which are designed and arranged such that an electrical connection can be established between mobile terminal equipment that can be positioned against or on the base surface and the contact means designed on the outer face. The outer face of the base surface is also provided with at least two recesses or depressions, each designed to physically receive an engagement means.

14 Claims, 9 Drawing Sheets

(52) U.S. Cl.
CPC ......... *G06F 1/1632* (2013.01); *H04B 1/3877* (2013.01); *B60R 2011/0071* (2013.01); *B60R 2011/0078* (2013.01); *H04M 1/0274* (2013.01)

(58) Field of Classification Search
CPC ... H04M 1/0254; H04B 1/082; H04B 1/3877; G06F 1/1626; G06F 1/1632; B60R 11/02; B60R 2011/0071; B60R 2011/0078
See application file for complete search history.

(56) References Cited

U.S. PATENT DOCUMENTS

| | | | |
|---|---|---|---|
| 2006/0052144 A1* | 3/2006 | Seil | H04B 1/3822 455/90.3 |
| 2006/0089186 A1* | 4/2006 | Richter | B60R 11/0247 455/575.9 |
| 2007/0002533 A1 | 1/2007 | Kogan et al. | |
| 2009/0284216 A1* | 11/2009 | Bessa | H02J 7/0044 320/101 |
| 2011/0164173 A1 | 7/2011 | Orf | |
| 2014/0355200 A1* | 12/2014 | Thiers | F16M 11/105 361/679.41 |
| 2015/0358044 A1* | 12/2015 | Barstead | H04B 1/3888 455/575.1 |
| 2017/0062999 A1 | 3/2017 | Thiers | |
| 2017/0294933 A1* | 10/2017 | Graham | H04B 1/3877 |

FOREIGN PATENT DOCUMENTS

| | | |
|---|---|---|
| DE | 20 2014 010 006 U1 | 4/2015 |
| DE | 20 2016 003 776 U1 | 9/2016 |
| WO | 2014/034998 A1 | 3/2014 |

\* cited by examiner

HOLDER ASSEMBLY FOR MOBILE TERMINAL EQUIPMENT

This application is a 35 U.S.C. § 371 National Stage Application of PCT/DE2018/000201, filed on Jul. 3, 2018, which claims the benefit of priority to Patent Application Serial No. DE 20 2017 003 503.0, filed on Jul. 4, 2017 in Germany, the disclosures of which are incorporated herein by reference in their entirety.

The disclosure relates to a holder arrangement for mobile devices.

BACKGROUND

Mobile devices are portable electronic devices which have a mobile power supply, for example cell phones, smartphones, handheld devices, PDAs, MDE devices, pocket computers or tablet computers. Such devices are suitable for mobile use outside a constant, stationary site or location and are intended to provide, for example, phone or navigation capability when someone is walking or driving or else photography capability or data collection or input at any desired use location. It is often necessary or desirable here to provide for hands-free use of the mobile device—for example to provide for navigation or phone capability while the user is driving a vehicle. At the same time, for mobile use, such devices regularly require their mobile power supply, usually a rechargeable battery, to be recharged.

Devices for retaining a mobile device in a vehicle, for example suction-cup holders for fastening a smartphone on the inner side of the windshield of an automobile, are generally known in the prior art. It is usually the case here that a cable connection to the cigarette lighter or else a proprietary connection to the vehicle electrics or electronics, at the same time, ensures the power supply to the smartphone either for operation or—if necessary—for simultaneous recharging of the rechargeable battery. Also generally known in the prior art are docking stations or cradles by means of which the mobile device is retained or mounted at a regular, stationary location and which usually comprise a physical accommodating or mounting device and also a power-supply device. The disadvantage with such devices, generally, is that they are intended, and configured, only for a specific use purpose that is to say either for installation in a motor vehicle or for use at a regular, stationary location, for example a desk. Furthermore, such devices are usually configured for use with a specific type of device. Devices of different dimensions or with a different power-supply interface cannot be used with the same suction-cup holder or docking station. For the same reason, the acquisition of a new device also renders necessary, at the same time, the new acquisition of an appropriate suction-cup holder and/or docking station. In the case of commercial use or industrial deployment of proprietary mobile devices, for example for mobile data collection by employees who are intended to remain in the operations rooms after the close of business, it is necessary to acquire different retaining and mounting devices with a power supply in each case for mobile use in vehicles and for mounting purposes in the operations rooms. If use is made of different mobile devices, this makes it necessary, accordingly, to acquire and provide different retaining and mounting devices. In the case of devices being changed over, appropriate new retaining and mounting devices have to be acquired.

DE 20 2014 010 006 U1 discloses a protective sheath and base station for handheld electronic devices. The protective sheath and the base station allow the device to be retained, mounted and recharged merely at a specific stationary site or location for said device. Furthermore, both are coordinated for use with a specific type of device, wherein each type of device requires all components to be adapted and remade. The parallel use of different types of device, and device changeover, in a company necessitates in each case the parallel or new acquisition in each case of all the components adapted correspondingly to the different types of device.

20 2016 003 776 U1 discloses an operating terminal which comprises an operating part, which is configured in the form of a closable housing with an interior for accommodating a tablet PC, and a docking station, which can be connected to the operating part via a releasable mechanical/physical connection. In one embodiment, the housing is designed such that it can be connected to a power source via the docking station by virtue of both the mechanical/physical connection and the interior of the housing having contact means for establishing a connection to a power source. On account of this technical configuration, the design disclosed by 20 2016 003 776 U1 provides for the use of the docking station with different models of tablet PC, it being necessary in each case for only the housing to be adapted to the respective three-dimensional shape of the desired tablet PC. The operating terminal disclosed by 20 2016 003 776 U1, however, merely allows tablet PCs to be retained, mounted and recharged at a specific stationary site or location having a docking station. Furthermore, for use with the docking station, it is imperative to produce an appropriate housing for each type of device.

SUMMARY

The disclosure is based on the object of creating an easy-to-produce, modular-assembly system for retaining, mounting and recharging different mobile devices both when they are being used on a mobile basis and at a stationary site or location. The intention, in particular, is for an interface which can be used universally for different mobile devices to be created both for physically retaining and mounting said devices and for recharging the same electrically.

The object is achieved according to the disclosure by a holder arrangement as claimed in claim 1; advantageous embodiments are described in the dependent claims.

The core of the disclosure is formed by a holder arrangement for mobile devices, comprising either a housing, which is formed with a main surface and has an interior which is designed for accommodating a mobile device, or an adapter element, which is formed with a main surface and is configured such that it can be physically connected to a mobile device by mechanical means, wherein, on its inner side and its outer side, the main surface is formed with electrical contact means which are configured, and arranged, such that an electrical connection can be established between a mobile device, which can be arranged on the inner side of the main surface and the contact means, which are formed on the outer side, and wherein, on its outer side, the main surface is also formed with at least two recesses or depressions, which are each configured for physically accommodating an engagement means. The main surface is a surface of the housing or adapter element on which the mobile device can be arranged. The inner side denotes that side of the main surface on which the mobile device can be arranged. The outer side denotes that side of the main surface which is directed away from the inner side. A recess or depression is to be understood as any recess, depression, indent, slot or groove which provides for a corresponding engagement means to be accommodated physically. The at least two recesses or depressions here are each configured such that, with account being taken of the respective mass and of the intended use purpose (e.g. stationary or mobile), they provide for sufficiently reliable physical fixing, via corresponding engagement means, of a mobile device accommodated by the housing or the adapter element. Within the context of the disclosure, this is also ensured, for example for use in the form of a holder in an automobile, for example when, on its outer side, the main surface has an individual recess which has in its peripheral region, in turn in a direction perpendicular to the engagement axis—i.e. in this case essentially parallel to the main surface—two slot-like depressions for accommodating hooks in a direction transverse to the engagement direction. The recesses or depressions are formed on the outer side of the main surface. They can be arranged, in the form of a recess, depression, indent, slot or groove, in the plane of the main surface itself or at an angle thereto. The disclosure has the advantage that it creates an easy-to-produce, modular-assembly system for retaining, mounting and recharging different mobile devices both when they are being used on a mobile basis and at a stationary site or location. The interface allows mobile devices to be both physically retained and mounted and electrically recharged, and it can be used universally with different types of device, in each case either an appropriately adapted housing or an adapter element being present. In the case of different mobile devices being used in parallel, or in the case of device changeover, all that is necessary in each case is for appropriate housings or adapter elements to be provided, whereas the configuration of all other components, including the engagement means, remains the same or these items can carry on being used. Furthermore, the holder arrangement has a particular advantage according to the disclosure insofar as the physical holder interface on the housing or adapter element (which, in turn, serve to accommodate the mobile device) merely provides recesses or depressions, which are each configured for physically accommodating an engagement means. As a result, in the event of it being necessary to provide a lockable physical connection, for example when a mobile device is being retained in an automobile, it is ensured that all the movable parts necessary can be formed outside the housing or adapter element. As a result, the design of the housing or adapter element—which has to be adapted in each case to the mobile device which has to be accommodated as intended—is kept as straightforward as possible. Furthermore, the amount of installation space which is functionally necessary for the housing or adapter element—that is to say on the device—is thus kept as small as possible, which allows the housing or adapter element, despite creating the functionality according to the invention disclosure, to remain permanently on the mobile device, the latter maintaining its mobile handling capability in the process.

In a straightforward embodiment of the adapter element, the latter is formed with at least two elastically bendable retaining arms, which are configured, and arranged, such that a physical connection to a mobile device can be established by mechanical means by virtue of the retaining arms engaging around said device in a form-fitting manner on two opposite peripheral sides, wherein the mobile device can be arranged on the inner side of the main surface.

For straightforward realization of a modular holder of the housing or of the adapter element (and therefore of a mobile device), the holder arrangement comprises a holder element, which is formed with at least two engagement means, which correspond in each case with recesses or depressions on the outer side of the main surface and are configured for establishing a releasable form-fitting and/or force-fitting connection between the holder element and the outer side of the main surface. The holder element constitutes the counterpart to the holder interface of the housing or adapter element and is designed in accordance with the intended use purpose (for example fastening in a vehicle or being retained or mounted at a stationary location).

For simultaneous use as a charging source, the holder element is formed with contact means which are arranged to correspond with the contact means formed on the outer side of the main surface of the housing or of the adapter element, and it is also formed with a connection device, which is configured for establishing an electrical connection between the contact means and a power source.

In order to render superfluous any cable connections which are additionally necessary, depending on how the interface of a mobile device used with the holder arrangement is equipped and also depending on the desired use purpose, the connection device is configured, in addition, for establishing a data-communication connection.

Straightforward connection of the housing or adapter element to the holder element and release of the housing or adapter element from the holder element are ensured in that two engagement means, on the holder element, are of hook-like configuration and are arranged to interact in pairs, wherein one engagement means is configured in a rigid state and the other engagement means is configured such that it can either be bent elastically or moved counter to a spring force in order to establish or to release the connection between the holder element and the main surface, and wherein, when the connection is in place, the two engagement means engage in the respectively corresponding depressions on the outer side of the main surface.

Straightforward manual operation for connecting the housing or adapter element to the holder element and releasing the housing or adapter element from the holder element is ensured in that the engagement means which is configured such that it can be bent elastically or moved counter to a spring force is formed with a rigidly connected lever arm, and the lever arm is formed with a pressure-exerting surface. For this purpose, the pressure-exerting surface is configured, for example, in the form of a key which can be operated by a fingertip and, via the lever arm connected rigidly to it, when subjected to pressure either bends the engagement means elastically or moves it counter to the spring force, as a result of which the engagement means engages in the corresponding depression or is released from the same.

In order to improve the handling of the holder arrangement, at least two recesses or depressions are formed on the outer side of the main surface and, at the same time, at least two engagement means of the holder element, said engagement means corresponding with said recesses or depressions, are formed with magnetic means, wherein each magnetic means of the main surface, in respect of its polarity and positioning, is assigned in each case one magnetic means of the holder element, and wherein at least two magnetic means of the main surface, on the one hand, and at least two magnetic means of the holder element, on the other hand, are formed in each case with different polarities with respect to one another. The associated pairs of magnetic means provide an additional force fit between the housing or adapter element and the holder element. At the same time, the respectively different polarities of the at least two magnetic means of the main surface, on the one hand, and of the at least two magnetic means of the holder element, on the other hand, ensure that the housing or adapter element and the holder element can be connected to one another only in one position, since, in a possible incorrect position—in the case of a symmetrical configuration for example rotated through 180° in relation to one another—the pairs of magnetic means, rather than being attracted, repel one another. The magnetic repulsion means that the user here additionally receives, at a relatively early stage, haptic feedback in respect of possible incorrect positioning.

The use of the holder element as a mobile holder solution in an automobile is straightforwardly ensured by the holder element being formed with a suction-cup holder. The suction cup is used to fasten the holder element, for example in a conventional manner, on the inner side of the windshield.

A further improvement in handling is ensured in that, on the side which is directed away from the outer side of the main surface, the holder element is formed with a pistol-like handle, which is oriented perpendicularly, or at an angle ranging from 60° to 120°, to the main surface. This allows a mobile device positioned in the housing or the adapter element to be straightforwardly handled in a coordinated manner like a "pistol". The display side of the mobile device is located here on the upper side of the construction as a whole—parallel to the main surface of the housing or of the adapter element—as a result of which, while handling the device, the user can take a look at the display simply by looking down at it. It is also possible for an additional (rechargeable) battery to be integrated in the pistol-like handle in order to extend the operating time of a mobile device which is positioned in the housing or the adapter element and connected thereto.

The modular use options for the holder arrangement are straightforwardly extended in that the holder element is formed with a spherical head for establishing a releasable form-fitting and/or force-fitting connection to a further element. The spherical head is used for the form-fitting and/or force-fitting fastening on a further, external element, which can be, for example, a docking station, a suction-cup holder or a stand having a fastening means which corresponds with the spherical head, for example an arrestable spherical seat or arrestable jaws with engagement surfaces adapted to the shape of the spherical head.

An easy-to-produce mounting or retaining device and also, if appropriate, a recharging device for in each case one or more housings or adapter elements (and therefore a plurality of mobile devices) is provided, in a straightforward configuration, in that the holder arrangement comprises a mounting or retaining device which is designed in the form of a wall-mounted, table-top or cabinet-mounted holder and has one or more mounting or retaining points, and wherein each mounting or retaining point is designed in each case in the form of a holder element in one of the embodiments described above.

BRIEF DESCRIPTION OF THE DRAWINGS

Further measures for improving the disclosure will be presented in more detail hereinbelow together with the description of preferred exemplary embodiments of the disclosure and with reference to the figures, in which.

DETAILED DESCRIPTION

Figure 1:
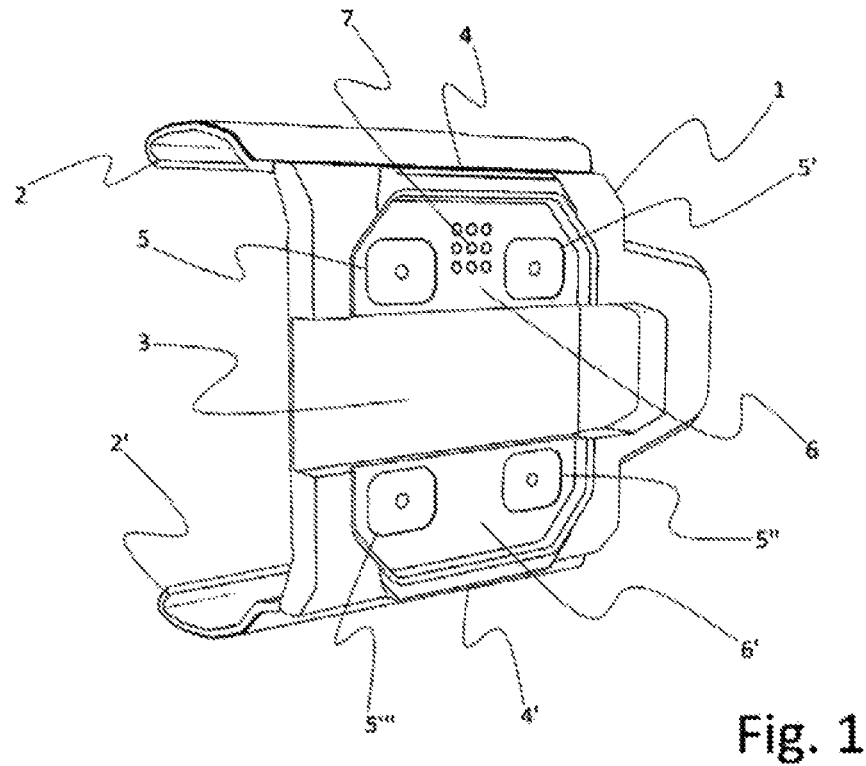
FIG. 1 shows a perspective illustration of an adapter element.
Figure 2:
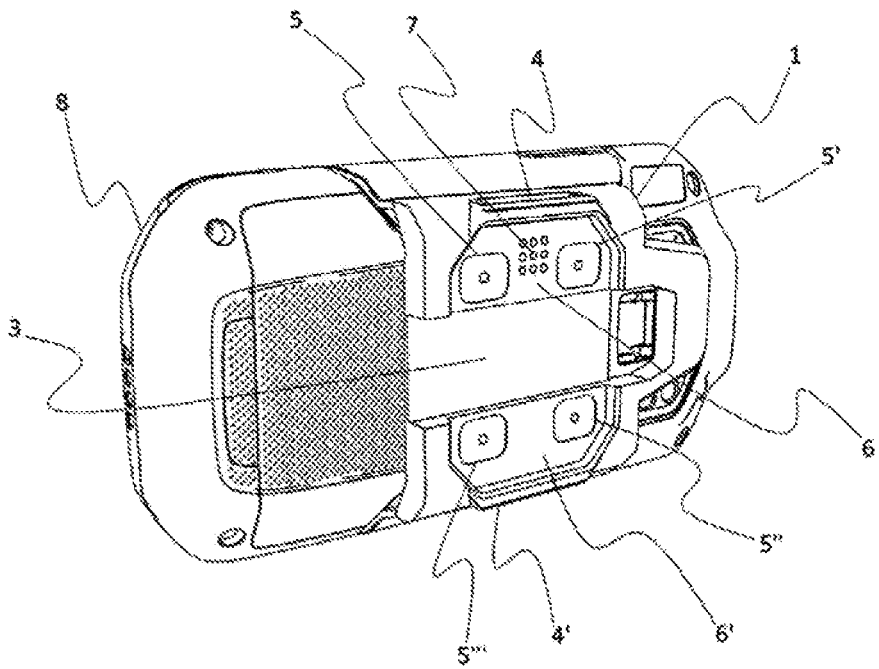
FIG. 2 shows a perspective illustration of a mobile device with an adapter element according to FIG. 1 connected thereto.
Figure 3:
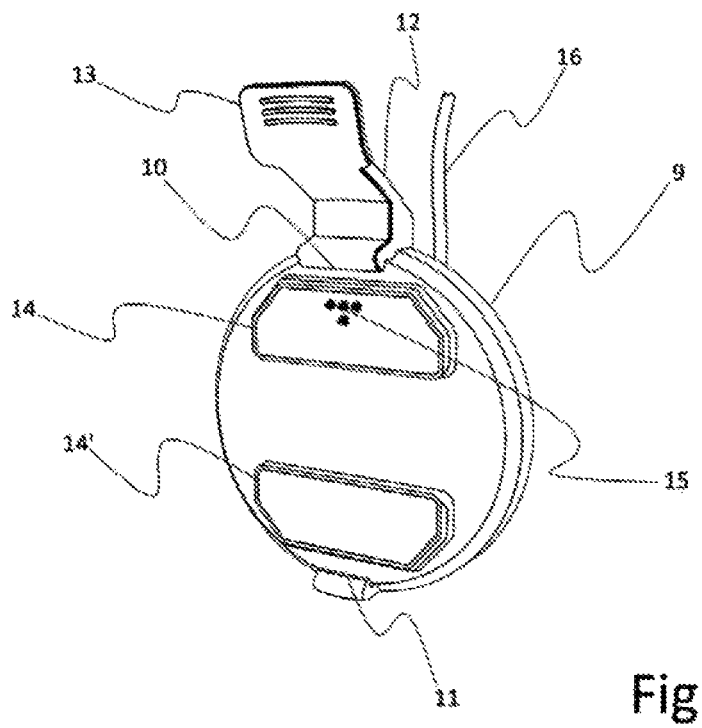
FIG. 3 shows a perspective illustration of a holder element.
Figure 4:
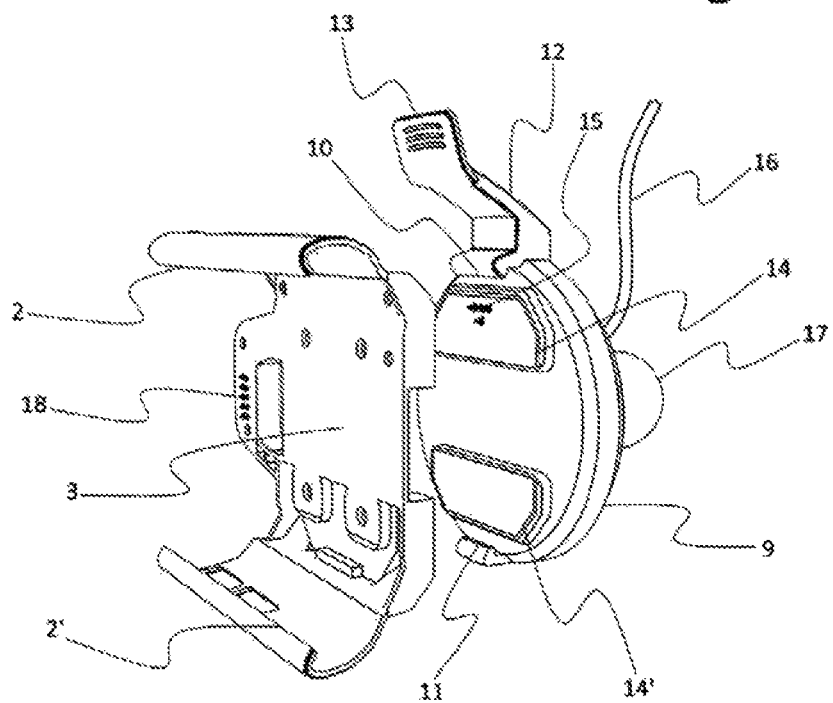
FIG. 4 shows a perspective illustration of the adapter element according to FIG. 1 and of the holder element according to FIG. 3.
Figure 5:
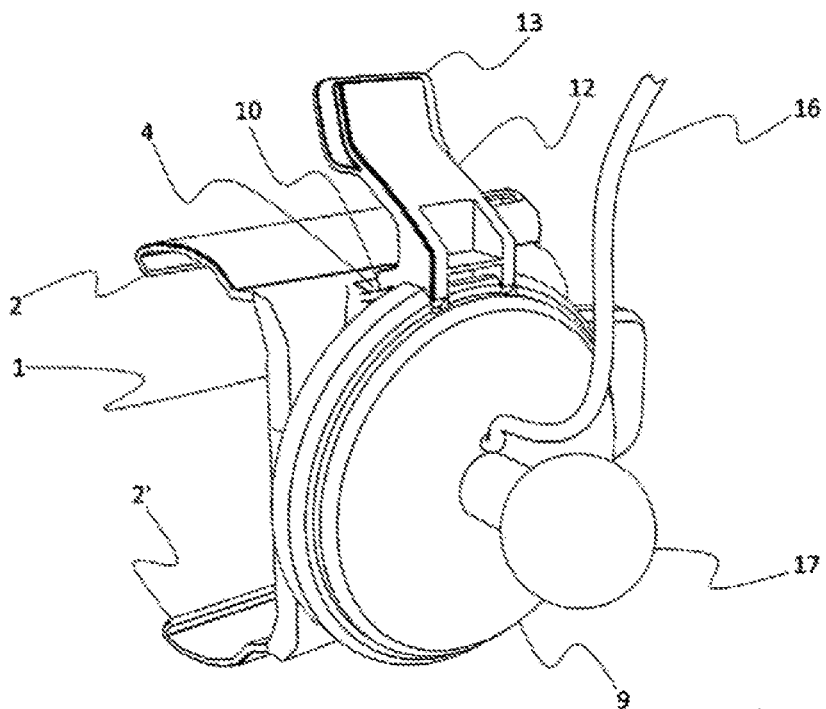
FIG. 5 shows a further perspective illustration of the adapter element according to FIG. 1 and of the holder element according to FIG. 3.

FIG. 1 and FIG. 2 show the adapter element 1, which is formed with two elastically bendable retaining arms 2 and 2'. The adapter element 1 is formed with the main surface 3. On its outer side, at the peripheries, the main surface 3 is formed with two slot-like depressions 4 and 4', which are arranged parallel to the plane of the main surface 3. Furthermore, on its outer side, the main surface 3 is additionally formed with four recesses 5 to 5', which are arranged within two further recessed regions 6 and 6', which are arranged centrally within the main surface 3. Finally, on its outer side, the main surface 3 is formed with the contact means 7 in the form of an array of nine female contacts in the form of cylindrical depressions for accommodating corresponding male contact pins. FIG. 2 shows the adapter element 1 physically connected to the mobile device 8 by mechanical means. The retaining arms 2 and 2' here engage around the mobile device 8 in a form-fitting manner on two opposite peripheral sides. FIG. 3 shows the holder element 9. The holder element 9 is formed with two hook-like engagement means 10 and 11, which correspond with the slot-like depressions 4 and 4'. The two hook-like engagement means 10 and 11 of the holder element 9 are arranged to interact in pairs so as to fix, from opposite directions, a workpiece in the corresponding depressions of which they engage. The hook-like engagement means 10 is connected to the lever arm 12 and configured such that it can be bent elastically. At its end, the lever arm 12 is formed as a pressure-exerting surface by way of the key 13. The hook-like engagement means 11 is of rigid design. A form-fitting connection between the hook-like engagement means 10 and 11 and the slot-like depressions 4 and 4' is established or released by the key 13 being subjected to manual pressure—for example by way of a fingertip—wherein the lever arm 12 bends in the rearward direction and the hook-like engagement means 10 connected thereto shifts its position upward and can leave the slot-like depression 4 which corresponds with it. When the key 13 is relieved of pressure, the lever arm 11 moves back in the forward direction into its rest position, wherein the hook-like engagement means 10 connected to it shifts its position downward and can engage in the slot-like depression 4. Furthermore, the holder element 9 is additionally formed with the engagement means 14 and 14', which are configured in the form of convexities and correspond with the recessed regions 6 and 6'. The direction in which the engagement means 14 and 14' engage in the corresponding recessed regions 6 and 6' define here an engagement axis within the context of the disclosure. The slot-like depressions 4 and 4' are arranged perpendicularly to said engagement axis. Finally, the holder element 9 is formed with the contact means 15, which are configured in the form of an array of four male contact pins, which are arranged to correspond with the contact means 7. In addition, the holder element 9 is formed with the connection device, which is designed in the form of a cable 16 and is configured for establishing an electrical connection between the contact means 15 and a power source, for example a cigarette lighter in a motor vehicle. Furthermore, as part of the connection device, the holder element 9 can comprise further electrical or electronic components, for example an electronics system for regulating/adapting an active supply voltage or current. Furthermore, in addition to supplying voltage, the cable 16 can also be configured for establishing a data-communication connection, for example to the electronics in an automobile. It is possible here for the contact means 15 and/or also the contact means 7 to comprise further contact pins or female contacts in the form of cylindrical depressions in order to represent, overall, the lines which are necessary for the desired electrical or electronic connections. FIG. 4 shows the holder element 9 together with the adapter element 1 which is to be connected. On its rear side—that is to say the side which is directed away from the adapter element 1—the holder element 9 is formed with the spherical head 17. The spherical head 17 serves to provide the physical connection to further elements, for example to a suction-cup holder for fastening the holder element 9 in a releasable manner on the inner side of a windshield. Instead of the spherical head 17, it is also possible for the holder element 9 to be formed, for example, directly with a fastening means such as, for example, a suction-cup holder. On the inner side of its main surface 3, the adapter element 1 is formed with the contact means 18, which are configured in the form of an array of a plurality of male contact pins. The contact means 18 serve to provide the electrical and/or electronic connection between the mobile device 8 and the contact means 7 on the outer side of the main surface 3. FIG. 5 shows a rear perspective view of the physical connection between the holder element 9 and the adapter element 1. When the key 13 is relieved of pressure, the lever arm 12 located in its rest position, the hook-like engagement means 10 engages in the depression 4 in a form-fitting manner. At the same time, the hook-like engagement means 11 engages in the depression 4', which, due to the perspective, is not illustrated in FIG. 5.

Figure 6:
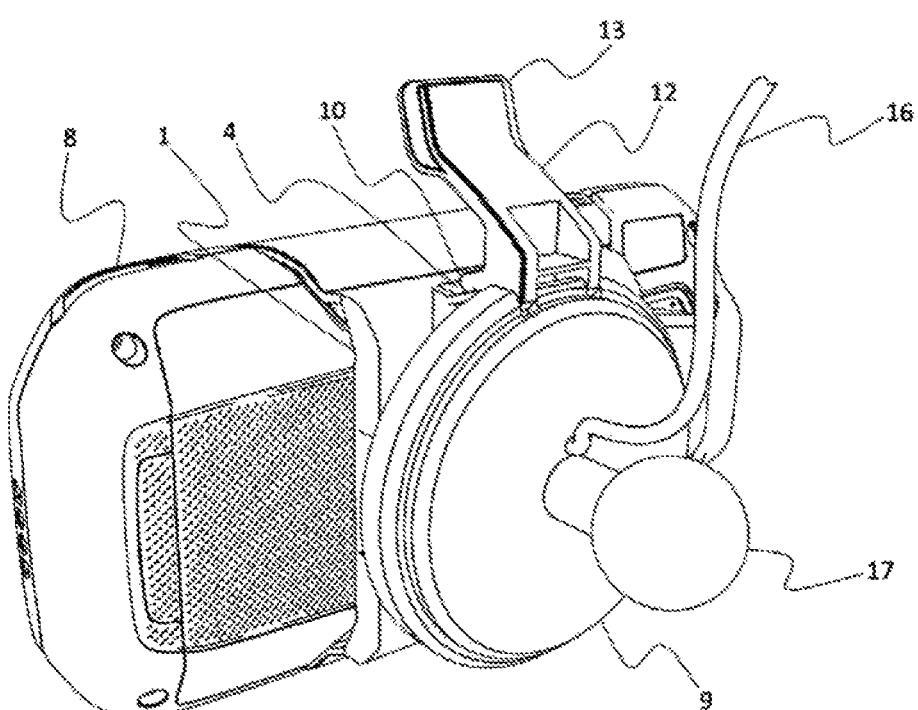
FIG. 6 shows a perspective illustration of the mobile device with the adapter element according to FIG. 1 connected thereto and with the holder element according to FIG. 3 connected to the adapter element.

FIG. 6 shows a rear perspective view of the physical connection between the holder element 9 and the adapter element 1 and between the adapter element 1 and the mobile device 8. The retaining arms 2 and 2' engage around the mobile device 8 in a form-fitting manner on two opposite peripheral sides.

Figure 7:
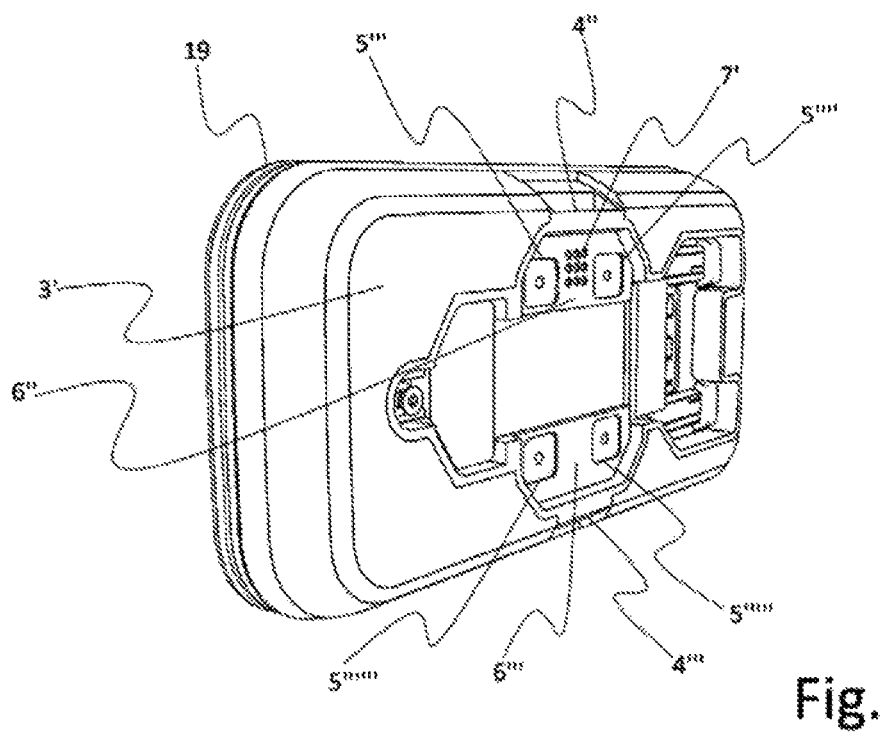
FIG. 7 shows a perspective illustration of a housing.
Figure 8:
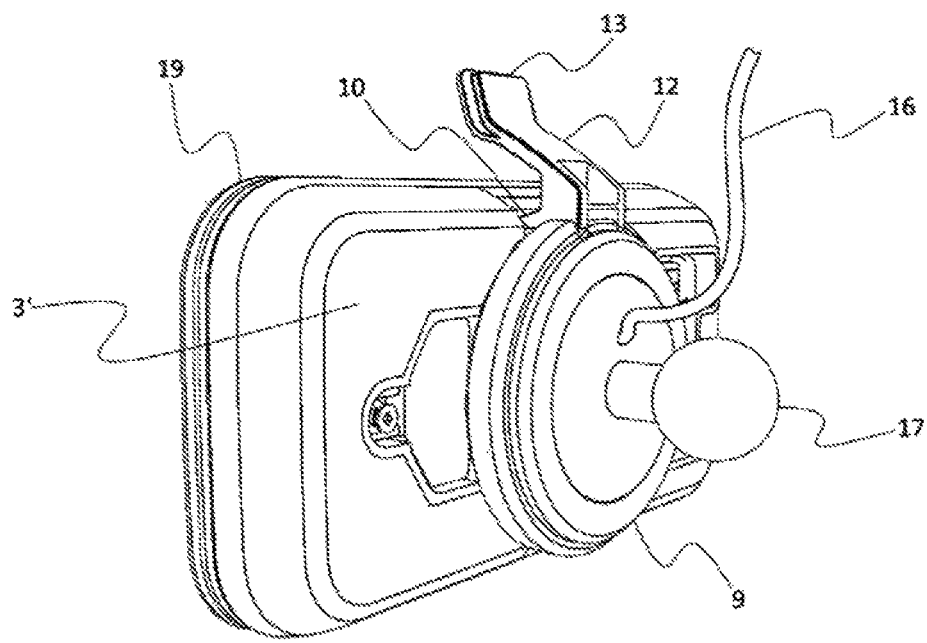
FIG. 8 shows a perspective illustration of the housing according to FIG. 7 and of the holder element according to FIG. 3 connected to the housing.

FIGS. 7 and 8 show a rear perspective view of a further embodiment of the holder arrangement, this time with the housing 19. The housing 19 is formed with the main surface 3'. The housing 19 is designed for accommodating a mobile device. On its outer side, at the peripheries, the main surface 3' is formed with two slot-like depressions 4'' and 4''', which are arranged perpendicularly to the plane of the main surface 3'. Furthermore, on its outer side, the main surface 3' is additionally formed with four recesses 5'''' to 5''''''', which are arranged within two further recessed regions 6'' and 6''', which are arranged centrally within the main surface 3'. Finally, on its outer side, the main surface 3' is formed with the contact means 7' which is an array of nine female contacts in the form of cylindrical depressions for accommodating corresponding male contact pins. On the inner side of its main surface 3', the housing 19 is formed with further contact means serving to provide the electrical and/or electronic connection between a mobile device accommodated by the housing 19 and the contact means 7' on the outer side of the main surface 3'. FIG. 8 shows a rear perspective view of the housing 18 physically connected to the holder element 9 by mechanical means. When the key 13 is relieved of pressure, the lever arm 10 located in its rest position, the hook-like engagement means 10 engages in the depression 4'' in a form-fitting manner. At the same time, the hook-like engagement means 11 engages in the depression 4''', which, due to perspective, is not illustrated in FIG. 8. At the same time, the contact means 7' are connected electrically here to the contact means 15, which, due to perspective, is not illustrated in FIG. 8.

Figure 9:
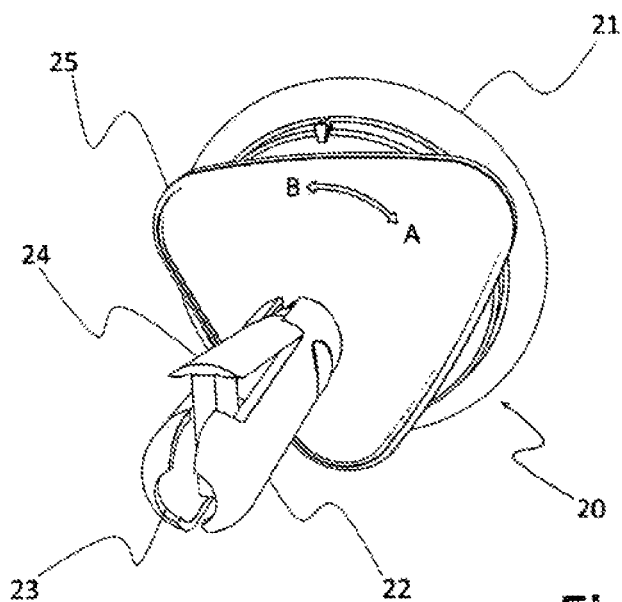
FIG. 9 shows a perspective illustration of a suction-cup holder.

FIG. 9 shows a further element of the holder arrangement in the form of the suction-cup holder 20. The suction-cup holder 20 comprises the suction cup 21 and the essentially cylindrical hollow body 22 with the circular opening 23 for accommodating the spherical head 17. The spherical head 17 is arrested in the hollow body 22 in a releasable manner as a result of the arresting bracket 24 being opened or closed. The suction-cup holder 20 is fastened on a windshield by someone pressing on the triangular plate 25 and rotating it in the arrow direction A, as a result of which the suction cup 21 is pressed in and air is displaced out of the same. This gives rise to a negative pressure between the interior of the suction cup 21 and the windshield. The suction-cup holder 20 is released from the windshield by someone rotating the triangular plate 25 in the arrow direction B, as a result of which an opening (not illustrated) is freed and air penetrates into the suction cup 21 until pressure has equalized in line with atmospheric pressure.

Figure 10:
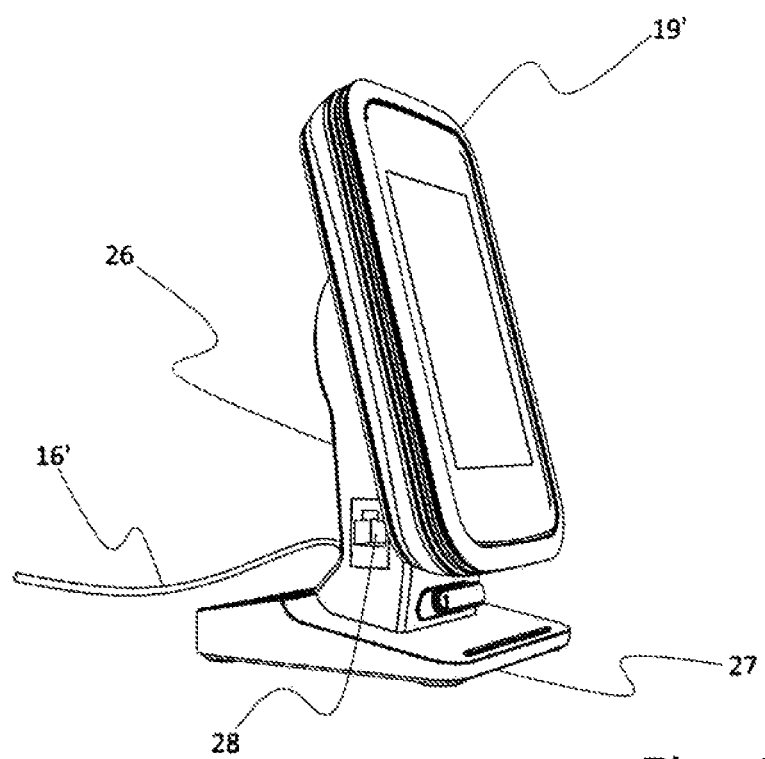
FIG. 10 shows a perspective illustration of the housing according to FIG. 7 and of an individual table-top holder connected to the housing.
Figure 11:
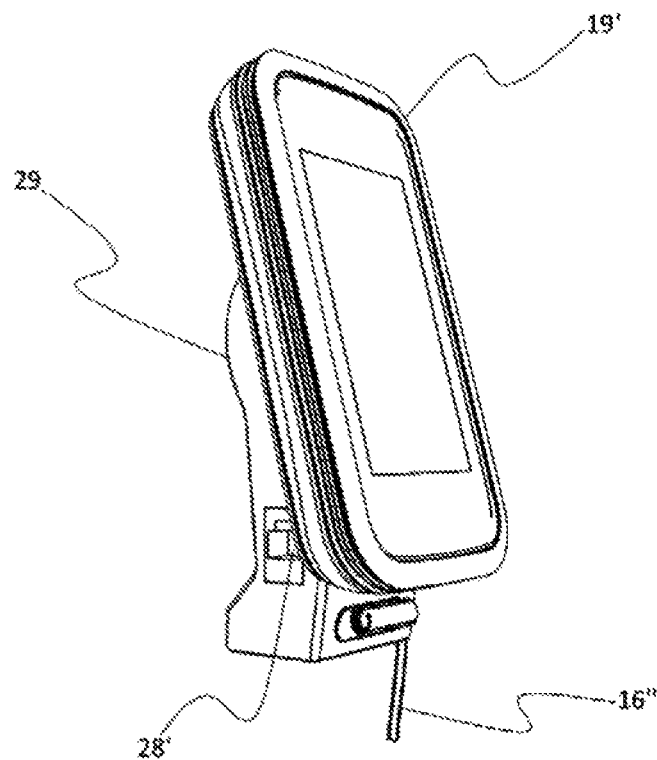
FIG. 11 shows a perspective illustration of the housing according to FIG. 7 and of an individual wall-mounted holder connected to the housing.
Figure 12:
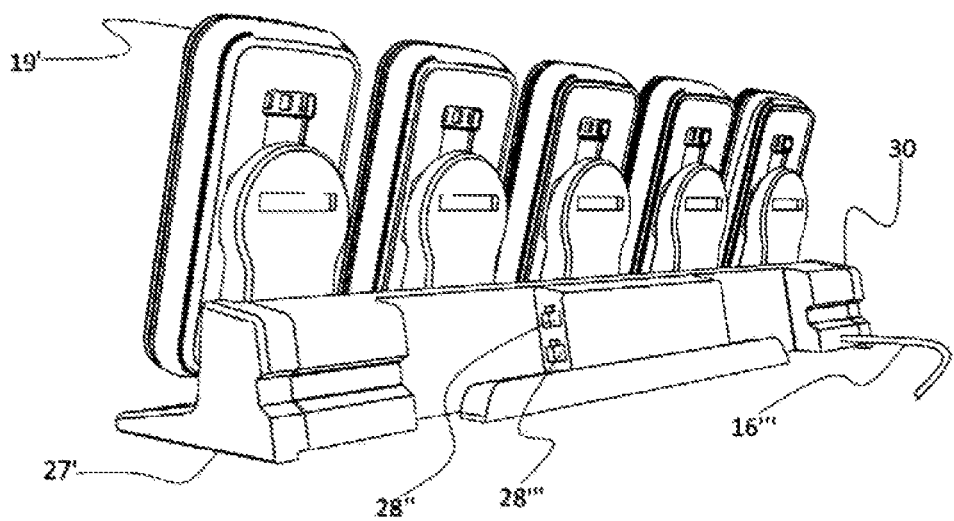
FIG. 12 shows a perspective illustration of a plurality of housings and of a multi-device table-top holder connected to the housings.
Figure 13:
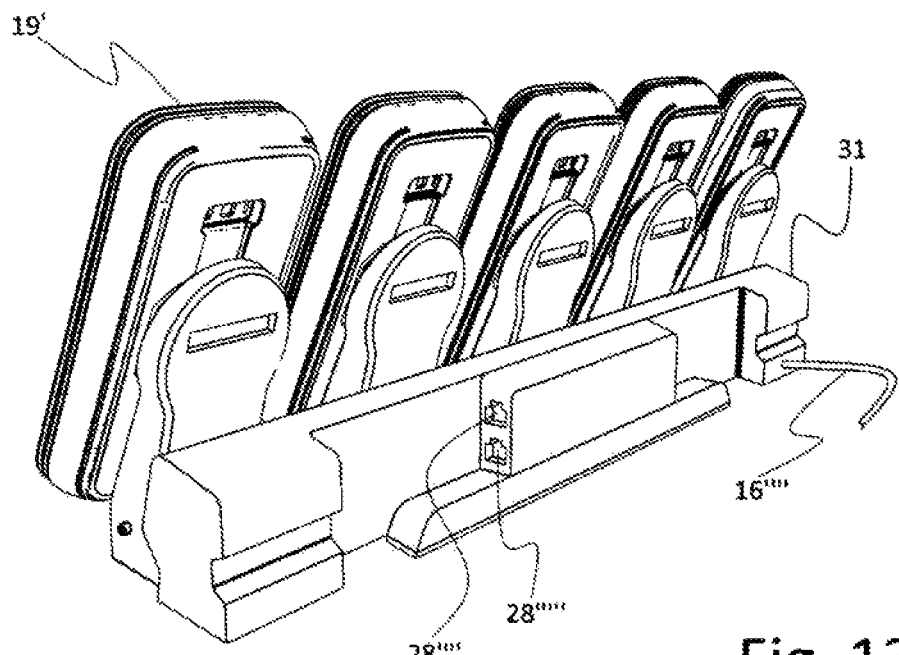
FIG. 13 shows a perspective illustration of a plurality of housings and of a multi-device wall-mounted holder connected to the housings.
Figure 14:
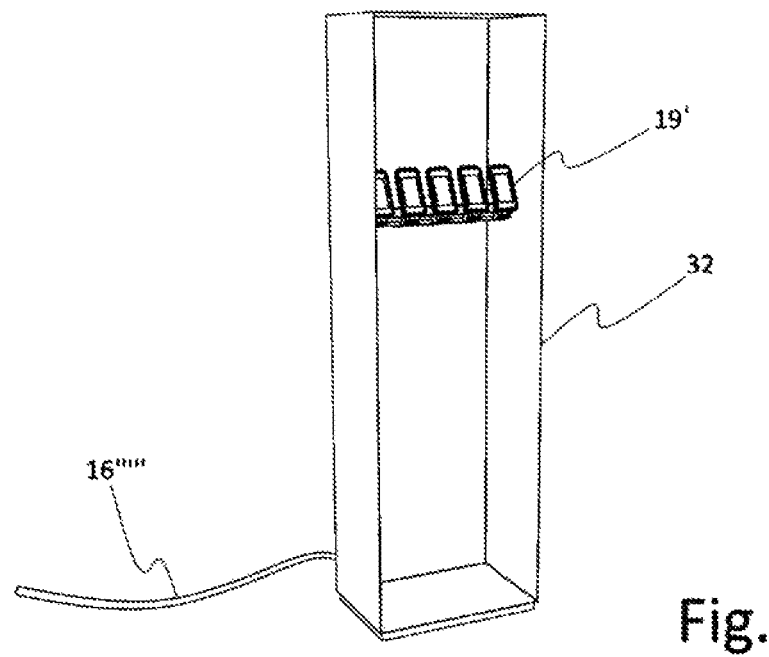
FIG. 14 shows a perspective illustration of a plurality of housings and of a multi-device cabinet connected to the housings.

FIG. 10 to FIG. 15 show a number of different embodiments of mounting or retaining devices which are designed in each case in the form of wall-mounted, table-top or cabinet-mounted holders and each have one or more mounting or retaining points. The mounting or retaining points are designed in each case in the form of a holder element with at least two engagement means, which correspond in each case with the depressions 4 to 4''' and/or the recesses 5 to 5''''''' and/or the recessed regions 6 to 6'''. Since the mounting or retaining devices of FIG. 10 to FIG. 15, these being designed in the form of wall-mounted, table-top or cabinet-mounted holders, each serve as stationary mounting or retaining locations, it is also sufficient in each case, for the purpose of establishing a sufficiently stable connection to the housings or adapter elements, to have, for example, straightforward, non-locking form-fitting engagement means corresponding to the engagement means 14 and 14' and/or engagement means which correspond with the recesses 5 to 5'''''''. Furthermore, the mounting or retaining points are each formed with contact means—consistent with the contact means 15—which correspond with the contact means 7 and 7' and are also formed with connection devices, which are configured for establishing an electrical connection to a power source and also a data-communication connection. FIG. 10 to FIG. 15 here each show embodiments of the mounting or retaining devices in conjunction with one or more housings which correspond essentially to the housing 19. However, the mounting or retaining devices of FIG. 10 to FIG. 15 are likewise suitable here for interacting with one or more adapter elements which correspond to the adapter element 1. FIG. 10 shows the individual table-top holder 26 with the stand 27 and the housing 19'. Furthermore, the individual table-top holder 26 comprises the data-communication connection 28 and the cable 16', which serves for voltage-supply purposes. FIG. 11 shows the individual wall-mounted holder 29 with the housing 19'. Furthermore, the individual wall-mounted holder 29 comprises the data-communication connection 28' and the cable 16'', which serves for voltage-supply purposes. FIG. 12 shows the multi-device table-top holder 30 with the stand 27' and the housing 19' as well as further housings which correspond to the housing 19'. Furthermore, the multi-device table-top holder 30 comprises the data-communication connections 28'' and 28''' and the cable 16''', which serves for voltage-supply purposes. FIG. 13 shows the multi-device wall-mounted holder 31 and the housing 19' as well as further housings which correspond to the housing 19'. Furthermore, the multi-device wall holder 31 comprises the data-communication connections 28'''' and 28''''' and the cable 16'''', which serves for voltage-supply purposes. FIG. 14 shows the multi-device cabinet 32 and the housing 19' as well as further housings which correspond to the housing 19'. Furthermore, the multi-device cabinet 32 comprises the cable 16''''', which serves for voltage-supply purposes.

Figure 15:
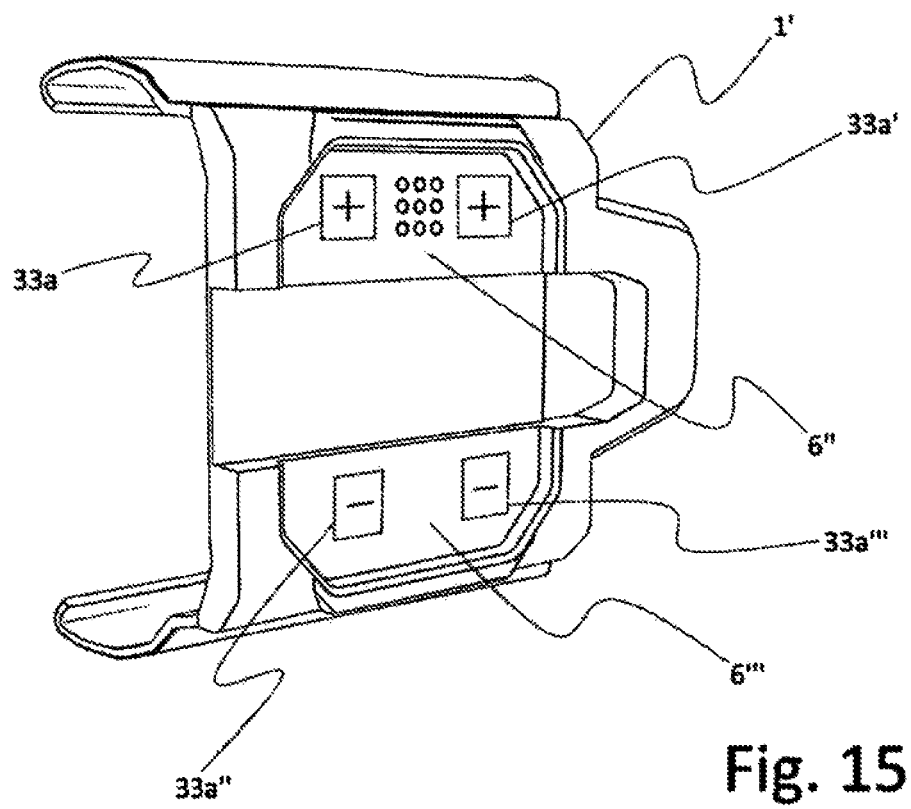
FIG. 15 shows a perspective illustration of a further adapter element.
Figure 16:
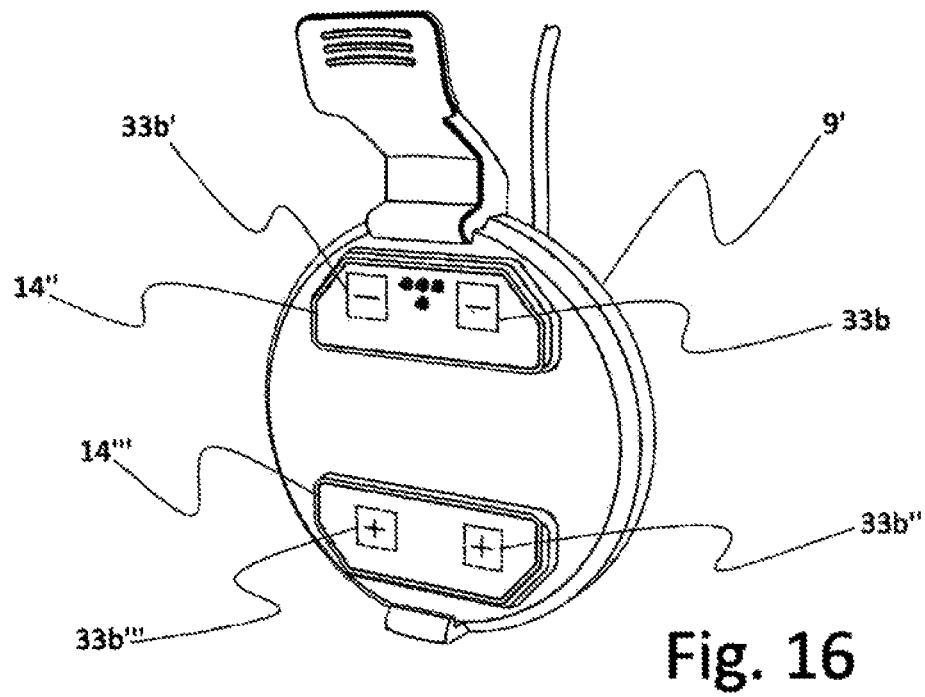
FIG. 16 shows a perspective illustration of a further holder element.

FIGS. 15 and 16 show the adapter element 1' and the holder element 9'. The adapter element 1' and the holder element 9' are slightly modified embodiments of the adapter element 1 according to FIG. 1 and of the holder element 9 according to FIG. 3. In contrast to the adapter element 1 according to FIG. 1, the adapter element 1' does not have any recesses 5, 5', 5'' and 5'''.

In contrast to the adapter element 1 according to FIG. 1, the adapter element 1' is formed with four magnetic means 33a, 33a', 33a'' and 33a''', of which the position within the recessed regions 6'' and 6''' is depicted schematically in FIG. 15. The respective polarity of the magnetic means 33a-33a''' is also depicted in FIG. 15. Otherwise, the adapter element 1' is designed in a manner corresponding to the adapter element 1. In contrast to the holder element 9 according to FIG. 3, the holder element 9' is formed with four magnetic means 33b, 33b', 33b'' and 33b''', of which the position within the engagement means 14'' and 14''' is depicted schematically in FIG. 16. The respective polarity of the magnetic means 33b-33b''' is also depicted in FIG. 16. Otherwise, the holder element 9' is designed in a manner corresponding to the holder element 9. Each of the magnetic means 33a'-33a''' of the adapter element 1' is assigned, in respect of its polarity and positioning, in each case one of the magnetic means 33b-33b''' of the holder element 9'. The associated pairs of magnetic means 33a/33b, 33a'/33b', 33a''/33b'' and 33a'''/33b''' provide a magnetic force fit between the adapter element 1' and the holder element 9'. The magnetic means 33 and 33', on the one hand, and the magnetic means 33'' and 33''', on the other hand, of the adapter element 1' are formed here with different polarities. At the same time, it is also the case that the magnetic means 33b and 33b', on the one hand, and the magnetic means 33b'' and 33b''', on the other hand, of the holder element 9' are designed with different polarities. This ensures that the adapter element 1' and the holder element 9' can be connected to one another only in one position, since, in a possible incorrect position—rotated through 180° in relation to one another—the pairs of magnetic means, rather than being attracted, repel one another. The magnetic repulsion in the position in which the pairs of magnetic means are rotated through 180° in relation to one another means that the user here additionally receives, at a relatively early stage, haptic feedback if incorrect positioning is attempted.

Figure 17:
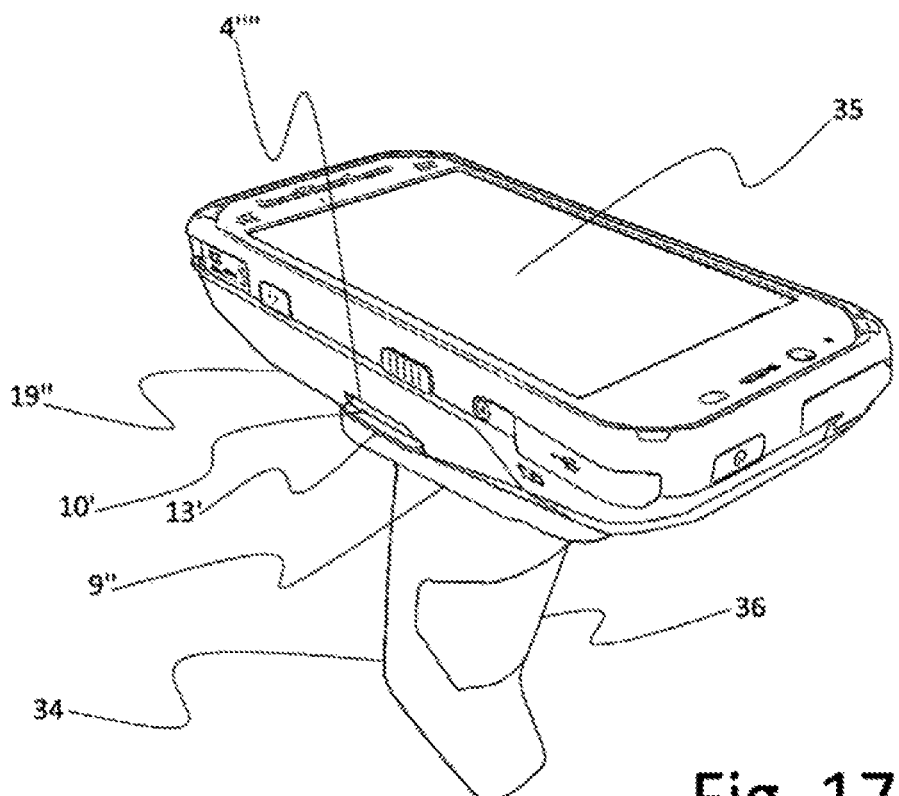
FIG. 17 shows a perspective illustration of a further housing.

FIG. 17 shows the housing 19''. The housing 19'' is designed in a manner corresponding to the housing 19 of FIGS. 7 and 8 and is formed, inter alia, with two slot-like depressions, of which, due to the perspective, only the depression 4'''' is evident in FIG. 17. The housing is physically connected to the holder element 9'' by mechanical means. The hook-like engagement means 10' of the holder element 9'' here engages in the depression 4''''. On the opposite longitudinal side of the housing 19''-which, due to the perspective, is not evident in FIG. 17—a corresponding further hook-like engagement means of the holder element 9'' engages in a corresponding slot-like depression in the housing 19''. The engagement of the hook-like engagement means 10' in the depression 4'''' can be released by virtue of the key 13' being subjected to loading. Otherwise, on its upper side—which butts against the outer side of the main surface of the housing 19'' and is not evident in FIG. 17—the holder element 9'' is designed in a manner corresponding to the holder element 9 according to FIG. 3. On its side which is directed away from the outer side of the main surface of the housing 19'', the holder element 9'' is formed with a pistol-like handle 34, which is oriented essentially perpendicularly to the main surface of the housing 19''. This allows a mobile device positioned in the housing 19'' to be straightforwardly handled in a coordinated manner like a "pistol". The display side of the mobile device is located here within the visible region 35 arranged on the upper side of the housing 19'', as a result of which the user, while handling the device, can take a look at the display simply by looking down at it. Furthermore, the pistol-like handle is formed with a covering flap 36, beneath which an additional rechargeable battery is inserted into the handle 34. The additional rechargeable battery serves to extend the operating time of a mobile device positioned in the housing 19'', it being connected to the housing 19'' via contact means which correspond to the contact means 15 of the holder element 9 according to FIG. 3.

LIST OF REFERENCE SIGNS

1 Adapter element
2, 2' Retaining arms
3 Main surface
4, 4', 4'', 4''', 4'''' Depressions
5, 5', 5'', 5''', 5'''', 5''''', 5'''''', 5''''''' Recesses
6, 6', 6'', 6''' Recessed regions
7, 7', 15 Contact means
8 Mobile device
9, 9', 9'' Holder element 10, 10', 11, 14, 14', 14", 14'" Engagement means
12 Lever arm
13, 13' Key
15, 18 Contact means
16, 16', 16", 16'", 16"" Cable
17 Spherical head
19, 19', 19" Housing
20 Suction-cup holder
21 Suction cup
22 Hollow body
23 Opening
24 Arresting bracket
25 Triangular plate
26 Individual table-top holder
27, 27' Stand
28, 28', 28", 28'", 28"", 28""' Data-communication connection
29 Individual wall-mounted holder
30 Multi-device table-top holder
31 Multi-device wall-mounted holder
32 Multi-device cabinet
33a, 33a', 33a", 33a'", 33b, 33b', 33b", 33b'" Magnetic means
34 Handle
35 Visible region
36 Covering flap

The invention claimed is:

1. A holder arrangement for mobile devices, comprising either a housing, which is formed with a main surface and has an interior which is designed for accommodating a mobile device, or an adapter element, which is formed with a main surface and is configured such that it can be physically connected to a mobile device by mechanical means,
wherein, on its inner side and its outer side, the main surface is formed with electrical contact means which are configured, and arranged, such that an electrical connection can be established between a mobile device, which can be arranged on the inner side of the main surface, and the contact means, which are formed on the outer side,
wherein, on its outer side, the main surface is also formed with at least two recesses or depressions which are spaced apart laterally from each other on the main surface, and which are each configured for physically accommodating an engagement means, and
wherein the electrical contact means are spaced apart from the at least two recesses.

2. The holder arrangement as claimed in claim 1 having an adapter element, wherein the adapter element is formed with at least two elastically bendable retaining arms, which are configured, and arranged, such that a physical connection to a mobile device can be established by mechanical means by virtue of the retaining arms engaging around said device in a form-fitting manner on two opposite peripheral sides, wherein the mobile device can be arranged on the inner side of the main surface.

3. The holder arrangement as claimed in claim 1, wherein the holder arrangement comprises a holder element, which is formed with at least two engagement means, which correspond in each case with recesses or depressions on the outer side of the main surface, and are configured for establishing a releasable form-fitting and/or force-fitting connection between the holder element and the outer side of the main surface.

4. The holder arrangement as claimed in claim 3, wherein the holder element is formed with contact means, which are arranged to correspond with the contact means formed on the outer side of the main surface of the housing or of the adapter element, and the holder element is also formed with a connection device, which is configured for establishing an electrical connection between the contact means and a power source.

5. The holder arrangement as claimed in claim 4, wherein the connection device is configured, in addition, for establishing a data-communication connection.

6. The holder arrangement as claimed in claim 3, wherein two engagement means are of hook-like configuration and are arranged to interact in pairs, wherein one engagement means is configured in a rigid state and the other engagement means is configured such that it can either be bent elastically or moved counter to a spring force in order to establish or to release the connection between the holder element and the main surface, and wherein, when the connection is in place, the two engagement means engage in the respectively corresponding recesses or depressions on the outer side of the main surface.

7. The holder arrangement as claimed in claim 6, wherein the engagement means which is configured such that it can be bent elastically or moved counter to a spring force is formed with a rigidly connected lever arm, and the lever arm is formed with a pressure-exerting surface.

8. The holder arrangement as claimed in claim 3, wherein at least two recesses or depressions on the outer side of the main surface and, at the same time, at least two engagement means of the holder element, said engagement means corresponding with said recesses or depressions, are formed with magnetic means, wherein each magnetic means of the main surface is assigned, in respect of its polarity and positioning, in each case one magnetic means of the holder element, and wherein at least two magnetic means of the main surface, on the one hand, and at least two magnetic means of the holder element, on the other hand, are formed in each case with different polarities with respect to one another.

9. The holder arrangement as claimed in claim 3, wherein the holder element is formed with a suction-cup holder.

10. The holder arrangement as claimed in claim 3, wherein, on the side which is directed away from the outer side of the main surface, the holder element is formed with a pistol-like handle, which is oriented perpendicularly, or at an angle ranging from 60° to 120° in relation, to the main surface.

11. The holder arrangement as claimed in claim 3, wherein the holder element is formed with a spherical head for establishing a releasable form-fitting and/or force-fitting connection to a further element.

12. The holder arrangement as claimed in claim 3, wherein the holder arrangement comprises a mounting or retaining device which is designed in the form of a wall-mounted, table-top or cabinet-mounted holder and has one or more mounting or retaining points, and wherein each mounting or retaining point is designed in each case in the form of a holder element as claimed in claim 3.

13. The holder arrangement as claimed in claim 1, wherein the at least two recesses or depressions are arranged at opposite peripheries of the main surface.

14. The holder arrangement as claimed in claim 1, wherein the at least two recesses or depressions are each respectively positioned in further recesses in the main surface, the further recesses being arranged at opposite peripheries of the main surface.

* * * * *